(12) United States Patent
Helmy et al.

(10) Patent No.: US 7,286,476 B2
(45) Date of Patent: Oct. 23, 2007

(54) ACCELERATING NETWORK PERFORMANCE BY STRIPING AND PARALLELIZATION OF TCP CONNECTIONS

(75) Inventors: Youssri Helmy, Lexington, MA (US); Tarek Nabhan, Cairo (EG)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 10/632,519

(22) Filed: Aug. 1, 2003

(65) Prior Publication Data

US 2005/0025150 A1 Feb. 3, 2005

(51) Int. Cl.
*H04L 12/28* (2006.01)

(52) U.S. Cl. .............. 370/230.1; 370/352; 370/392; 370/477; 709/228; 709/232; 709/247

(58) Field of Classification Search .......... 370/230.1, 370/255, 351, 352, 389, 392, 401, 412, 465, 370/468, 469, 474, 477, 251, 536; 709/228, 709/232, 247
See application file for complete search history.

(56) References Cited

U.S. PATENT DOCUMENTS

| | | | |
|---|---|---|---|
| 5,657,452 A | 8/1997 | Kralowetz et al. | |
| 5,768,525 A | 6/1998 | Kralowetz et al. | |
| 5,945,933 A | 8/1999 | Kalkstein | |
| 6,012,062 A | 1/2000 | Jagadish et al. | |
| 6,115,384 A | 9/2000 | Parzych | |
| 6,304,567 B1 | 10/2001 | Rosenberg | |
| 6,314,095 B1 | 11/2001 | Loa | |
| 6,397,259 B1 | 5/2002 | Lincke et al. | |
| 6,449,658 B1 * | 9/2002 | Lafe et al. | 709/247 |
| 6,577,653 B1 * | 6/2003 | Rochberger et al. | 370/536 |
| 6,658,463 B1 * | 12/2003 | Dillon et al. | 709/219 |
| 6,775,305 B1 * | 8/2004 | Delvaux | 370/535 |
| 6,816,455 B2 * | 11/2004 | Goldberg et al. | 370/230 |
| 6,820,133 B1 * | 11/2004 | Grove et al. | 709/238 |
| 7,139,811 B2 * | 11/2006 | Lev Ran et al. | 709/217 |
| 2002/0013840 A1 * | 1/2002 | Border et al. | 709/224 |

(Continued)

FOREIGN PATENT DOCUMENTS

WO WO 01/37516 A2 5/2001

OTHER PUBLICATIONS

RFC 2616, Hypertext Transfer Protocol-HTTP/1.1, Jun. 1999, pp. 1-147.*

(Continued)

*Primary Examiner*—Chi Pham
*Assistant Examiner*—Ahmed Elallam
(74) *Attorney, Agent, or Firm*—Darby & Darby PC; John W. Branch (57) ABSTRACT

An architecture for optimizing network communications that utilizes a device positioned at two edges of a constrained Wide Area Network (WAN) link. The device intercepts outgoing network packets and reroutes them to a proxy application. The proxy application uses multiple, preferably persistent connections with a network accelerator device at the other end of the persistent connection. The proxy applications transmit the intercepted data. Packet mangling may involve spoofing the connection request at each end node; a proxy-to-proxy communication protocol specifies a way to forward an original address, port, and original transport protocol information end to end. The packet mangling and proxy-to-proxy communication protocol assure network layer transparency.

23 Claims, 4 Drawing Sheets

U.S. PATENT DOCUMENTS

| | | | |
|---|---|---|---|
| 2002/0042839 A1* | 4/2002 | Peiffer et al. | 709/238 |
| 2002/0055966 A1* | 5/2002 | Border et al. | 709/200 |
| 2002/0055983 A1* | 5/2002 | Goddard | 709/217 |
| 2002/0071436 A1* | 6/2002 | Border et al. | 370/395.32 |
| 2002/0071438 A1 | 6/2002 | Singh | |
| 2002/0136224 A1 | 9/2002 | Motley | |
| 2003/0123481 A1* | 7/2003 | Neale et al. | 370/466 |
| 2003/0177395 A1 | 9/2003 | Pardee et al. | |
| 2003/0177396 A1* | 9/2003 | Bartlett et al. | 713/201 |
| 2003/0219022 A1* | 11/2003 | Dillon et al. | 370/395.52 |
| 2004/0001519 A1* | 1/2004 | Fisher et al. | 370/535 |
| 2004/0015591 A1* | 1/2004 | Wang | 709/228 |
| 2004/0093420 A1* | 5/2004 | Gamble | 709/231 |
| 2004/0103225 A1* | 5/2004 | McAlpine et al. | 710/52 |
| 2004/0111523 A1* | 6/2004 | Hall et al. | 709/230 |
| 2004/0172475 A1* | 9/2004 | Tenereillo et al. | 709/229 |
| 2004/0215746 A1* | 10/2004 | McCanne et al. | 709/219 |
| 2004/0243703 A1* | 12/2004 | Demmer et al. | 709/224 |
| 2005/0044242 A1* | 2/2005 | Stevens et al. | 709/228 |
| 2005/0243835 A1* | 11/2005 | Sharma et al. | 370/395.42 |

OTHER PUBLICATIONS

Huffman, David A., "A Method for the Construction of Minimum-Redundancy Codes," *Proceedings of the I.R.E.*, 40:1098-1101 (1952).

Ziv, Jacob, et al., "A Universal Alorithm for Sequential Data Compression," *IEEE Transactions on Information Theory*, IT23(3):337-343 (1977).

Sivakumar, H. et al. (2000) "PSockets: The Case for Application-level Network Striping for Data Intensive Applications using High Speed Wide Area Networks," Proceedings of Super Computing 2000 (SC2000), Dallas, Texas.

* cited by examiner

ACCELERATING NETWORK PERFORMANCE BY STRIPING AND PARALLELIZATION OF TCP CONNECTIONS

BACKGROUND OF THE INVENTION

The present invention relates to Wide Area Network (WAN) communications, and in particular to placing devices at both ends of a communication link to intercept packets and reducing latency by making parallel transport layer connections.

The growth in data communication traffic, including email, client/server applications, multimedia applications, Internet and intranet applications, has continued to cause critical bandwidth shortages across many networks. This demand for instant data communication often exceeds the available capacity, congestion and delay result. As more software applications move from Local Area Networks (LANs) to Wide Area Networks (WANs), user response time increases, and thus can become a critical limiting factor in smooth operation of an enterprise. With offices widely distributed around the globe and present day budgetary constraints on new telecommunications deployments, the implementation of additional wide area links is cost prohibitive for many international installations. Consequently, network system architects need additional solutions to help them efficiently use existing bandwidth to support more applications and more end users.

The Open Systems Interconnection (OSI) reference model is widely used to define the flow of data traffic across a network. The OSI model has seven layers; each of the seven layers communicates with a layer below it through a specific interface and its peer layer on a different system in the network through a specific protocol. The combination of all networking protocol layers is often referred to as the networking stack. Packet based Transmission Control Protocol over Internet Protocol (TCP/IP) is perhaps the most widely known protocol in use in today's WANs such as the Internet and even private networks. IP is a network layer (Layer 3) protocol that defines a set of standards for addressing and routing of packets across a connectionless network.

The Transmission Control Protocol (TCP) layer is a connection oriented protocol that primarily serves to achieve reliable delivery of data. TCP was originally designed for relatively low-speed, unreliable networks. With the emergence of high-speed WANs, various improvements have been applied to TCP to reduce latency and achieve improved bandwidth. For example, one common way to improve the bandwidth and reduce latency while still using TCP on a reliable high-speed network is to tune the so-called "window size" appropriately.

More particularly, an application typically requests data to be sent to another application at a remote machine. The TCP protocol stack, as typically located in the kernel of an operating system of the sending machine, handles requests from various applications and passes data to the network. This TCP stack partitions the data into segments to be sent over appropriate transmission media, i.e., physical layer connections, and waits for an acknowledgement from the receiving application to know that a particular segment has been received correctly. TCP achieves this by defining how long it will wait, i.e., a window size on both the sender and receiver.

The TCP window size thus defines the amount of time that a sender will wait for an acknowledgement from a receiver before sending any more data. Thus, after sending an initial block of data once the window size limit is reached, the sender will stop sending data until an acknowledgement from the receiver is returned. It can be appreciated, therefore, that proper selection of TCP window size is potentially critical in improving performance.

In order to achieve maximum performance, it has been suggested to set the window size to approximately the product of the bandwidth times the expected latency delay. When the sender and receiver are connected by a high-speed WAN, this bandwidth-times-delay product value is quite high, and many packets may be sent before a wait state actually occurs.

However, in order to accomplish this improvement in performance, the TCP window size parameter has to be changed at both the source and destination node in order to achieve maximum throughput. This involves changing parameters for the TCP stack in the kernel and typically has to be done by a system administrator at both ends. Also, in order to determine the optimum window size, a performance analysis must often need be done in order to fine-tune its value. This operation can take at least several hours or maybe even several weeks, and it may not deliver the best theoretical results due to fluctuations in network performance due to other application using the same WAN, network congestion, or other factors beyond the sender and receiver's control.

Some have suggested that an application layer process (i.e., at Layer 7) may be used to improve network performance. This is achieved by using a software application at the sending and receiving nodes that implements a technique known as network striping. The striping application partitions data across several open sockets under control of the application program. See, for example, the technique described in "PS Sockets: The Case for Application Level Network Striping or Data Intensive Applications Using High-Speed Wide Area Networks" by Sivakumar, H., et al., Proceedings of Super Computing 2000 (SC2000), Dallas, Tex., November 2000. However, this approach still requires modification of application layer software at both ends of the connection in order to achieve desired performance improvements.

It is also well known to compress data at a much higher layer, such as at the application layer (i.e., at Layer 7). For instance, images can be compressed in a variety of formats such as the Graphics Interchange Format (.gif) or the Joint Photographic Experts Group format (.jpeg). These data file-encoding formats reduce the space required for storage as well as the bandwidth needed for transmission. Hence, at the application layer a server may encode file before transmission to a client on the other end of a WAN connection. Each file received by the client is then decoded at the application layer to generate the original file. However, this approach also requires modifying standard application layer software at each end of the connection.

International Patent Publication Number WO 01/37516 describes a technique whereby a private network connection is implemented between devices known as accelerator exchange servers. A corresponding accelerator exchange client software is installed at a client node. The accelerator exchange client software may be implemented as a browser program adds on, for example.

U.S. Pat. No. 5,657,452 also discloses a method for setting up a connection over a data network. A proxy engine is used to implement data compression. However, this approach requires also installation of the proxy engine so that it runs in a local endpoint node application.

SUMMARY OF THE INVENTION

The present invention provides an architecture for a network acceleration device that provides increased performance over a Wide Area Network (WAN). In this approach, a network acceleration device is positioned at each one of at least two edges of a WAN connection. The device intercepts outgoing Internet Protocol (IP) packets, rerouting them to a proxy application on the device. The proxy application establishes multiple, parallel Transmission Control Protocol (TCP) layer connections with a proxy application located within the corresponding network accelerator device at the other end of the WAN link.

The transmitted data stream is then divided, or "striped" across the multiple parallel TCP connections. The multiple TCP layer connections may be opened over a single physical layer (PHY) connection, although if sufficient network resources are available, multiple PHY connections may also be used.

The device uses techniques such as address spoofing and a proxy-to-proxy communication protocol to assure network transparency from the perspective of the client devices, so that they do not have to install or run any special application software. The data may optionally be processed using a compression and/or caching algorithm. These end node devices the only view a standard virtual connection; no modification is needed to their applications or standard network protocol layer processing. Responsibility for intercepting TCP connection request packets and completing the multiple parallel connections is entirely the function of the network accelerator devices.

This architecture provides a number of benefits for network optimization as compared to traditional packet based compression schemes.

In a preferred embodiment, data is transferred over the WAN link via a persistent connection. Thus, connection and termination requests packets are not repeatedly transmitted over the WAN link.

Thus by increasing the number of TCP connections, even without increasing the number of PHY connections, network utilization is actually increased. This reduces the need for wait states, since it is less likely that the TCP window size will be reached for a given desired throughput. As a result, a significant boost in the performance of applications running over the WAN is realized.

The invention may also use data compression techniques and a compression dictionary to compress all streams of data belonging to a given connection. Typically, different streams of the same connection will have a common context. In this instance, therefore, the dictionary will be relevant and contribute to overall performance.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

To achieve the desired performance improvement the present invention employs a network accelerator device (NET ACCEL) 14 at each end of a constrained Wide Area Network (WAN) connection. In the example in FIG. 1, improved communication is to be provided between a first or Local Area Network (LAN) 11-1 and a second LAN 11-2. The respective LANs 11 each consist of a number of client computing devices located at network end nodes such as devices 10-1-1, 10-1-2, . . . 10-1-m that comprise the first LAN 11-1, and similar client devices located at nodes 10-2-1, 10-2-2, . . . 10-2-n located within the second LAN 11-2. It is important to note that the devices herein referred to as the "clients" 10 are unaware that their traffic is being communicated via the network accelerators 14-1 and 14-2. Traffic passing through the network accelerators 14 is compressed in a way in which is transparent to the end nodes 10 while achieving the required bandwidth reduction. The manner of implementing this will be described in detail shortly.

Figure 1:
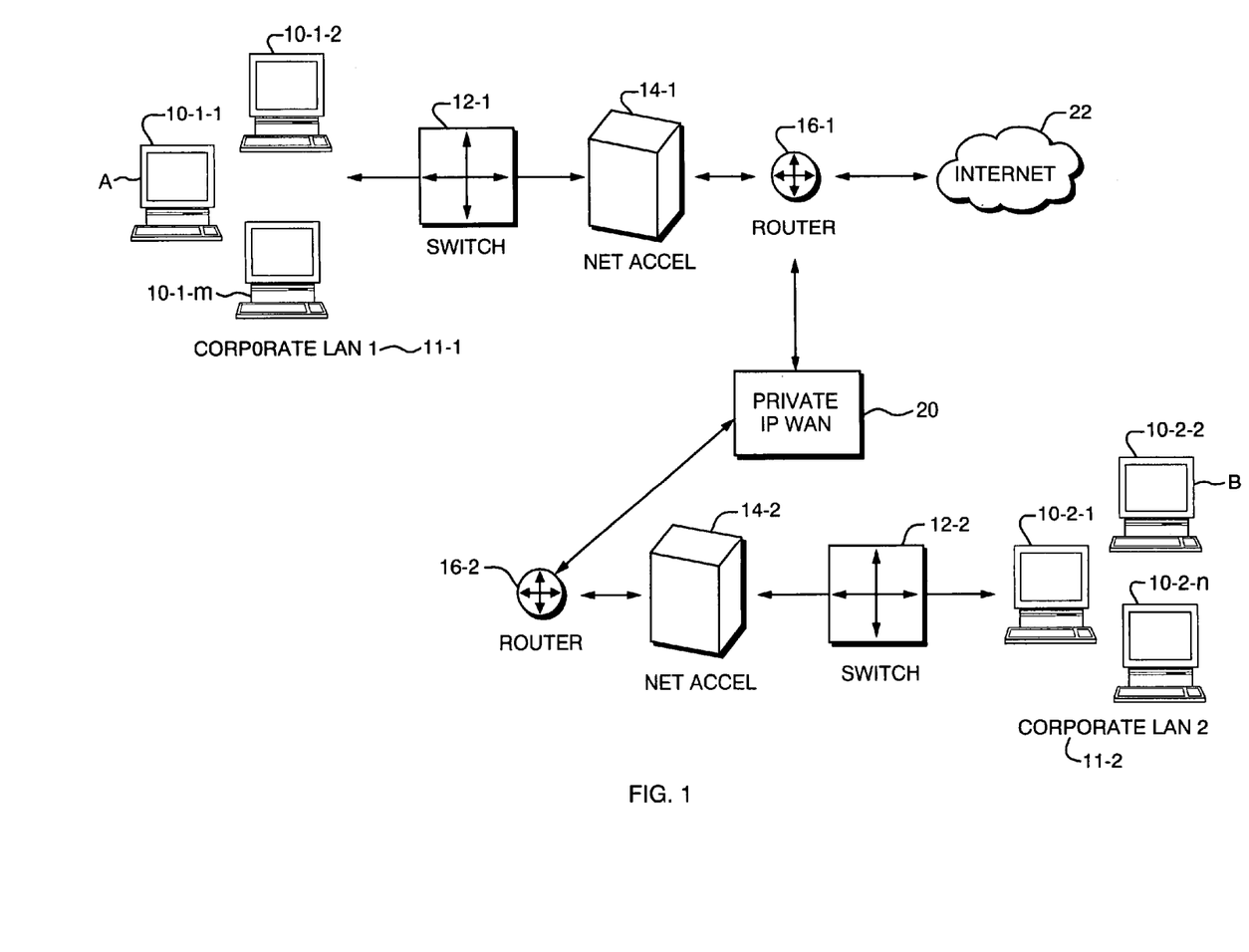
FIG. 1 is a high-level block diagram showing where network acceleration devices are implemented in a WAN network.

In general, clients 10-1 associated with first LAN 11-1 connect one or more switches 12-1 to the network accelerator 14-1 to a router 16-1. Router 16-1 has available connections to the second LAN 11-2 through a private WAN 20 that may, for example, be Internet Protocol (IP) based. The second LAN 11-2 similarly consists of a router 16-2, network accelerator, 14-2 switches 12-2 and associated clients or nodes 10-2.

Figure 2:
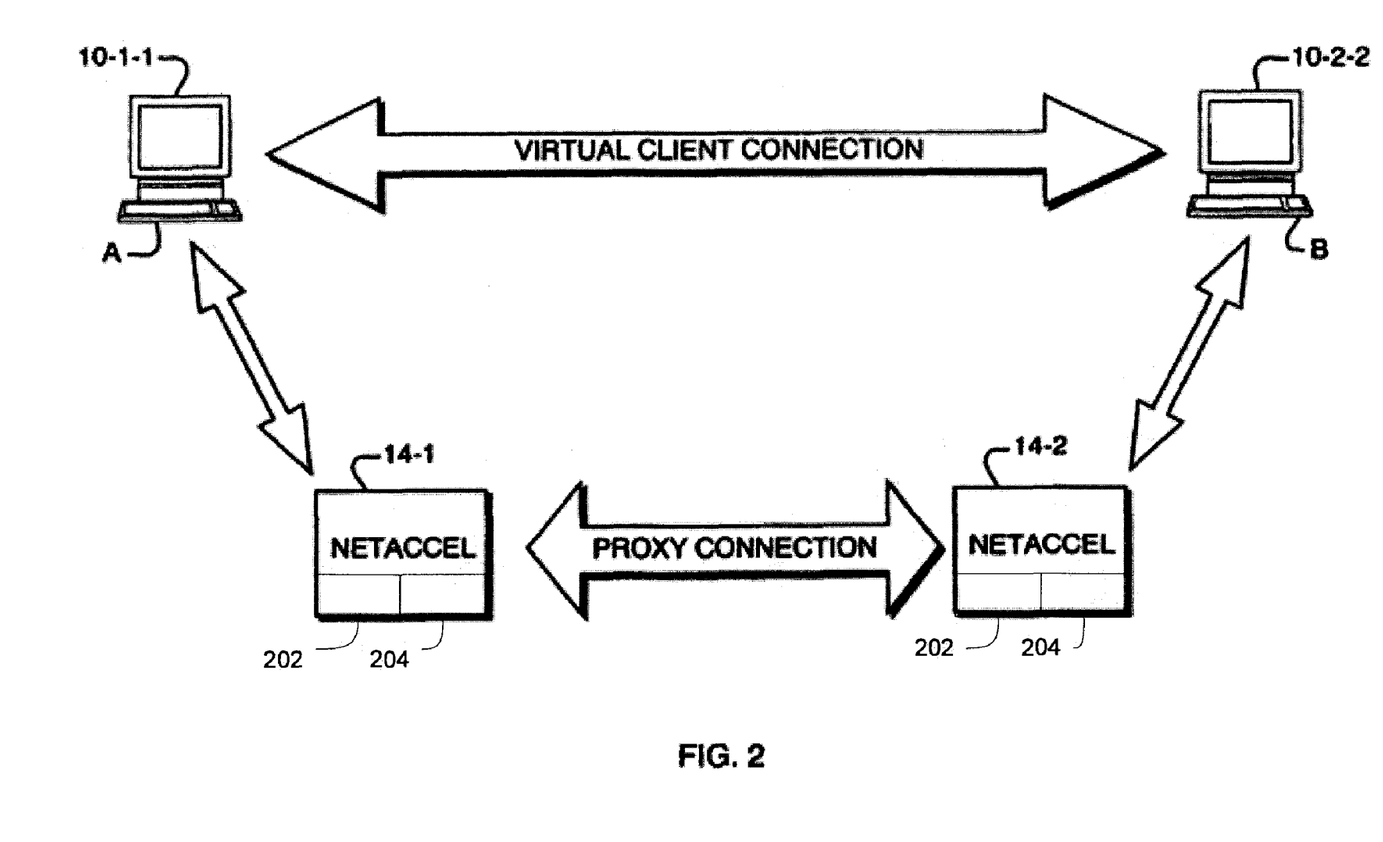
FIG. 2 is a high-level block diagram illustrating how a network transparency is achieved through the proxy connection.

The network accelerators 14-1 and 14-2 provide a proxy server for connections established between the respective LANs 11 that they serve. Thus, as shown in FIG. 2, from the perspective of client 10-1-1 and 10-2-2, they have directly established a connection in the usual way and the existence of the proxy connection is entirely transparent to them. The implementation of such a proxy is done with known address spoofing techniques to assure transparency. As will be understood shortly, each proxy connection will potentially use only a single physical layer connection, but connect over multiple transport layer (layer 4) (TCP) sessions.

Figure 3:
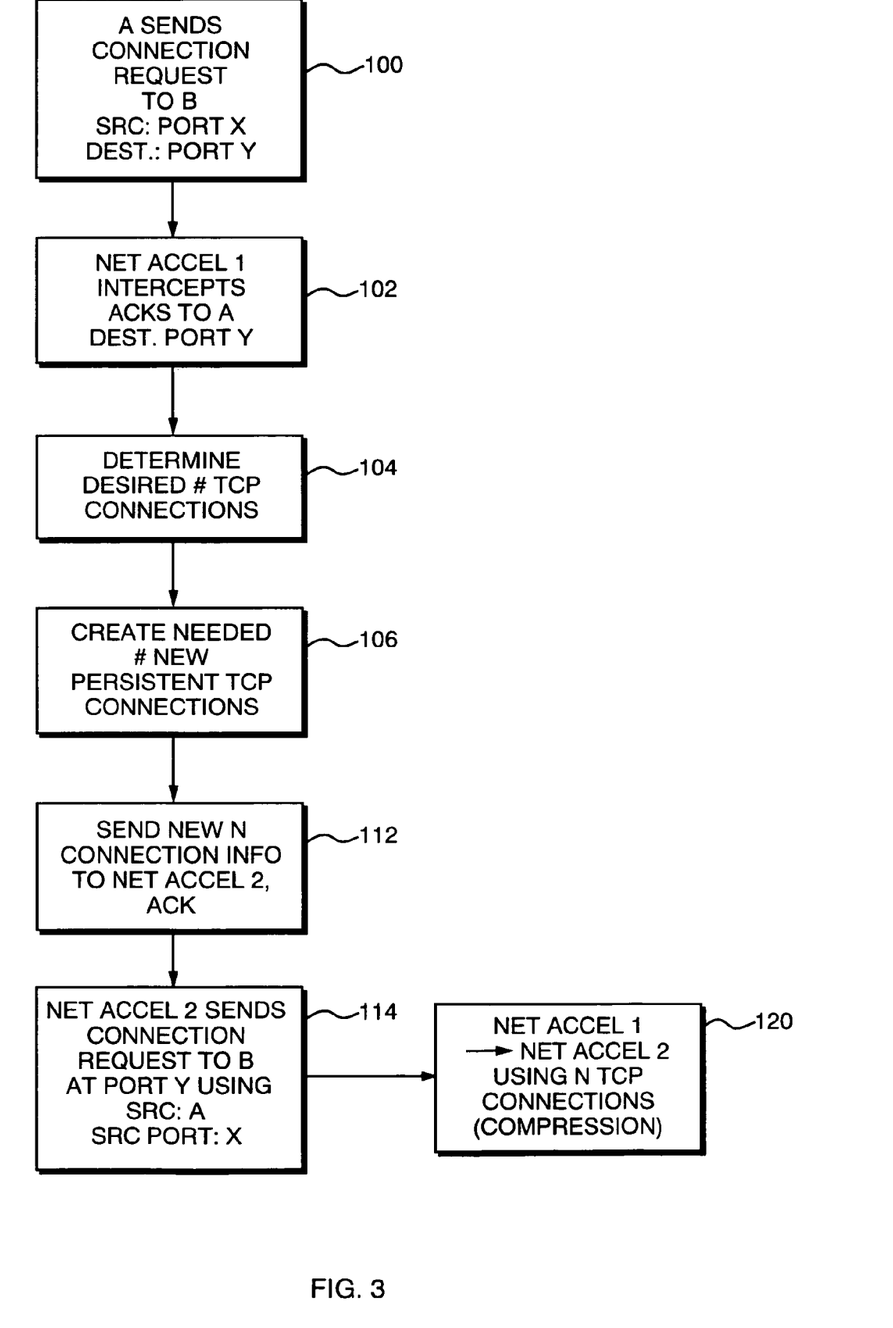
FIG. 3 is a flow diagram illustrating how LAN packets are processed.

Referring now to FIG. 3 as well as FIG. 1, consider that one of the clients 10-1-1 in the first LAN 11-1, known as Machine A, wishes to establish a connection with another client 10-2-2 in the second LAN 11-2, known as Machine B. The interaction of the main components of the system will now be described in detail. In a first step 100, a connection request packet is transmitted from Machine A. The connection requests that a connection be established between Machine A and Machine B. The connection request may, for example, specify port x for Machine A and port y for Machine B. At the TCP level, the connection request may take the form of a SYN message.

In the next step 102, the network accelerator 14-1 associated with the first LAN 11-1 is the first to intercept the connection request. It completes the connection request with Machine A by spoofing Machine B. For example, a response by network accelerator 14-1 is provided to Machine A using the destination address and port specified in the intercepted connection address, and replying to Machine A with a proxy acknowledgement in such a way as to fool Machine A into thinking it is connecting directly to Machine B when in fact it is not. This interception is performed by a proxy application running on the network accelerator as will be described in connection with FIG. 4.

The proxy application running on network accelerator 14-1 then assigns one or more of the persistent connections it has with the network accelerator 14-2 to handle the connection requested by Machine A. This can be done through the process beginning at state 104.

For example, a determination is made by network accelerator A 14-1 as to how many active TCP connections should be set up to form the proxy connection to network accelerator 14-2. This can depend upon a number of factors, such as observed or expected link latency, available bandwidth, current link utilization, user settings (permissions) and the like.

A number, N, of parallel TCP sessions are then opened between network accelerators 14-1 and 14-2. It should be understood that the N sessions may be opened over a single physical and link layer connection or over multiple physical layer connections as well.

In any event, processing next continues to a state 112 where the new connection information is passed in a message between network accelerator 14-1 and network accelerator 14-2. This connection information defines the characteristics of the desired N connections between Machine A and Machine B.

In state 114, network accelerator 14-2 has finally received everything it needs to establish a connection with machine B. In response, it then sends its own connection request to Machine B on its local LAN 14-2. This connection request is established at port y using a source address for Machine A and source port x. Thus, network accelerator 2 also spoofs its connection to Machine B at its local end.

With the multiple end to end connections now set up through the proxies associated with network accelerators 14-1 and 14-2, packets may now travel between Machine A and Machine B through the proxies provided by network accelerators 14-1 and 14-2. All packets related to established connections are intercepted by a network accelerator 14 and rerouted to a proxy application running on it. After being buffered, the proxy application allocates the data among the N persistent TCP connections. The data is then sent to the remote network accelerator at the other end of the proxy. The proxy running on the remote network accelerator reassembles the received streams, and then sends the reassembled packets to the corresponding client using the source and destination address and ports that it has for this connection.

To facilitate reassembly of data at the receiving end, the proxy application may add sequence numbers or time stamps to the packets before they are split up to be sent over the N TCP connections.

The benefit of splitting up the original segments over multiple TCP sessions is that acknowledgement wait times are thus spread across all connections, occurring in parallel. This is in place of a rather larger wait time associated with a single connection.

Figure 4:
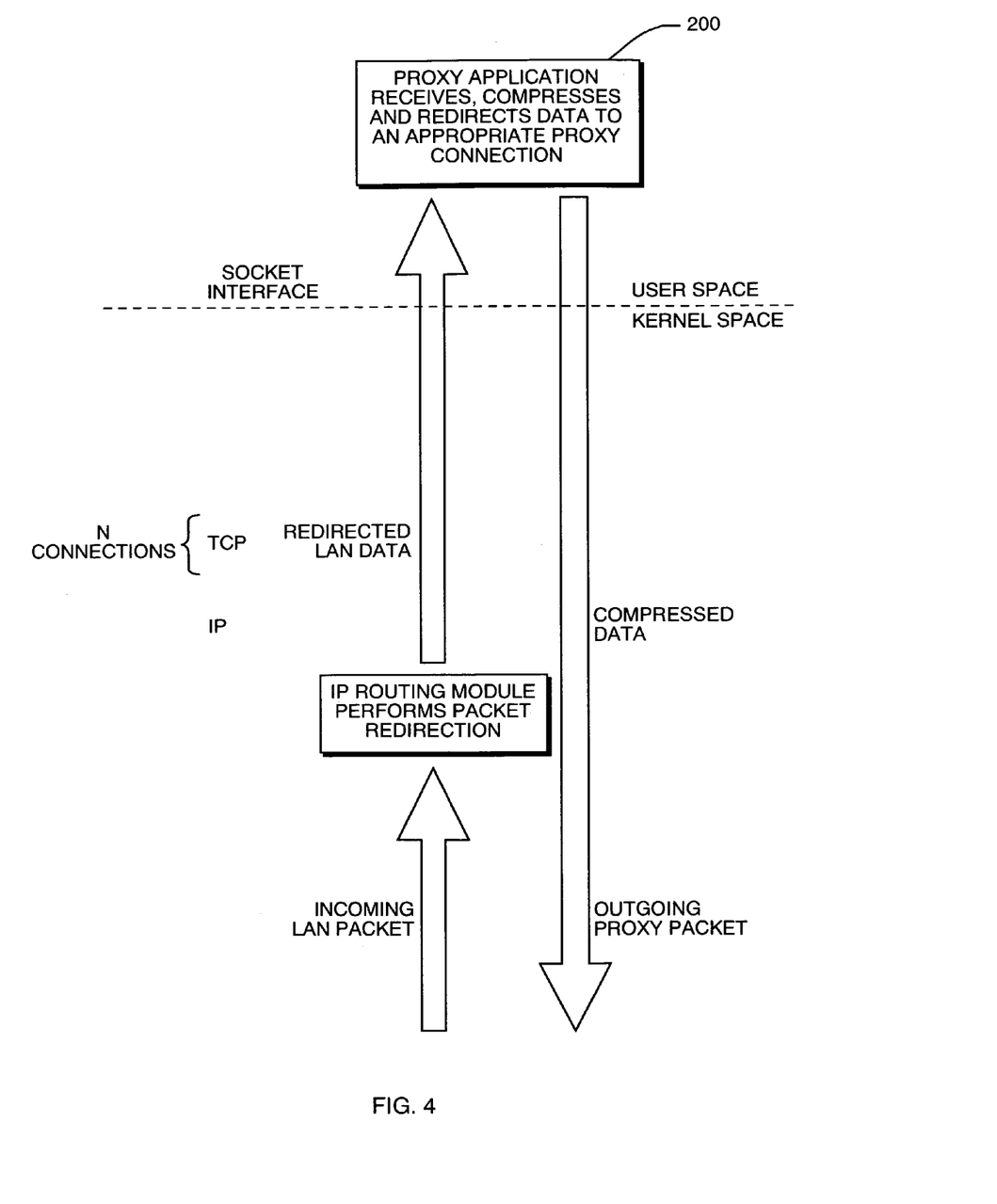
FIG. 4 is a software hierarchy illustrating where the proxy is located.

FIG. 4 is a high-level software diagram for implementation of the invention. An IP packet routing module within each network accelerator 14 performs packet redirection functions on incoming LAN packets. These are passed through IP and TCP layers, redirecting the packets to a proxy application 200. The proxy application 200 may access the rerouted data via standard socket API calls.

The proxy application then receives, compresses and redirects data to multiple proxy connections (as was described in connection with the steps 104 through 114 in FIG. 3.) On the receiver side, reassembles data is fed out from the proxy application, back down through the protocol layers to provide the outgoing proxy packets.

The system therefore consists of at least two network accelerators 14-1 and 14-2 with one positioned at each end of a Wide Area Network (WAN) link. The WAN link provides available persistent connections between network accelerator machines 14.

In order for each remote network accelerator to be informed of the characteristics of the connection it is dealing, a proxy-to-proxy protocol is employed. Information transmitted via this proxy-to-proxy protocol includes at least the original transport protocol i.e., information as to whether or not the original protocol is TCP or UDP, original addresses and ports, start and end points for data and any possible error conditions.

In addition, packet "mangling" techniques can be used so that all packets originating from a network-computing device to its local LAN are spoofed to reflect the characteristics of the original connection. For example, the network accelerators may modify and replace source and destination addresses or other fields. Thus, Machine A is at all times of the impression that it communicating directly with Machine B, and vise versa. This further enables the existence of the network accelerators 14-1 and 14-2 to remain completely unknown to Machines A or Machines B.

If desired, data compression can be implemented by the network accelerators 14 as well.

In the preferred embodiment, the compression scheme used is a variation of LZ77 and Huffman coding compression algorithms. The original LZ77 algorithm is described in a paper by Ziv J., et al., "A Universal Algorithm for Sequential Data Compression," IEEE Transactions on Information Theory, Vol. IT-23 (1979) pp. 337-343, although variants thereof can be used. The Huffman coding compression algorithm is described in "A Method for the Construction of Minimal Redundancy Codes," Proceedings of the IRE, Vol. 40, (1952), pp. 1098-1101, although again, variants can be used. In a preferred embodiment, compression occurs as follows. Data is first compressed using an LZ77 algorithm. This algorithm uses a persistent compression dictionary associated with a persistent connection assigned to transfer the data. In the next step, a Huffman coding algorithm is then applied to the results of the first step. If the results of the previous steps exceed the size of the original data, then the original data is sent as is.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for handling packet traffic in a data network comprising the steps of:

routing outgoing network layer packet traffic associated with a network layer connection from a selected source node to a local network accelerator associated with a node which is a source of the packet traffic for a destination node, the local network accelerator running a proxy application that operates as a proxy for the node that is the source of the packet traffic;

receiving, at the proxy application, intercepted packet traffic;

opening two or more persistent Transmission Control Protocol (TCP) transport layer end-to-end connections in parallel over at least one physical layer connection between the local network accelerator and at least one remote network accelerator, at least the two or more persistent TCP transport layer connections servicing the selected source node; and striping the transmitting of processed packet traffic to at least one remote network accelerator associated with the destination node which is a destination of the packet traffic via at least the two or more persistent TCP transport layer connections, wherein the remote network accelerator runs another proxy application operating as a proxy for the destination node.

2. A method as in claim 1 wherein a proxy to proxy protocol is employed to specify at least an original TCP transport protocol identifier, original address, and original ports of the nodes.

3. A method as in claim 1 wherein the proxy application uses a dictionary based compression algorithm is to decode the data prior to transmission.

4. A method as in claim 3 wherein a Huffman coding algorithm is applied to compress the data.

5. A method as in claim 3 wherein a dictionary associated with the network layer connection is utilized to service other network layer connections.

6. A data network routing device comprising:

a router, connected to receive incoming packets from a source node, the router examining the incoming packets to determine if they are addressed to a destination node which is not local to the router, and if so, routing them to a socket interface; and a proxy application, connected to receive incoming packets from the socket interface, the proxy application associated with the router, and the proxy application, acting as a proxy for the source node, also establishing multiple, persistent Transmission Control Protocol (TCP) transport layer end-to-end connections in parallel on behalf of the source node over at least one physical layer connection, the multiple, persistent TCP transport layer connections carrying packets striped in parallel to another proxy application operating as a separate proxy for the destination node.

7. A device as in claim 6 additionally wherein the proxy application additionally receives packets from a network connection addressed to a destination node which is local to the router.

8. A device as in claim 7 wherein packets are compressed by the proxy application, additionally comprising:

a data decompressor, for decompressing packets so received; and wherein the router also forwards decompressed packets to the destination node.

9. A device as in claim 6 wherein at least one TCP transport layer sessions are carried over a persistent connection established with another data network routing device having the other proxy application running thereon.

10. A device as in claim 6 wherein a proxy to proxy protocol is used to pass original source node and destination node information.

11. A device as in claim 6 wherein a proxy to proxy protocol specifies an original protocol type for the packets.

12. A method for communicating a data stream between a source node and a destination node, comprising:

establishing a plurality of persistent Transmission Control Protocol (TCP) transport layer connections in parallel between a first proxy application in communication with the source node and a second proxy application in communication with the destination node, wherein the plurality of persistent TCP transport layer connections are provided between the first proxy application and the second proxy application over at least one physical layer connection;

enabling the first proxy application to forward the data stream from the source node to the destination node, wherein the data stream is provided over a first TCP transport layer client connection to the first proxy application, and wherein the first proxy application stripes the data stream over the plurality of persistent TCP transport layer connections between the first proxy application and the second proxy application; and enabling the second proxy application to provide the striped data stream received over the plurality of persistent TCP transport layer connections to the destination node over a second TCP transport layer client connection.

13. The method of claim 12, further comprising:

enabling the communication of the data stream to the destination node to appear to the source node as occurring directly over the first TCP transport layer client connection; and enabling communication with the source node to appear to the destination node as occurring directly over the second TCP transport layer client connection.

14. The method of claim 12, wherein enabling the first proxy application to receive the data stream for the destination node, further comprises enabling the first proxy application to spoof an address associated with the source node for the first TCP transport layer client connection.

15. The method of claim 12, wherein enabling the second proxy application to provide the data stream to the destination node, further comprises enabling the second proxy application to spoof at least another address associated with the destination node for the second TCP transport layer client connection.

16. The method of claim 12, further comprising if the destination node is remote to the source node, providing the data stream to the first proxy application over a socket interface.

17. The method of claim 12, wherein if a plurality of data streams are provided over the plurality of persistent TCP transport layer connections, enabling the first proxy application to employ a dictionary based compression algorithm on at least a portion of at least one data stream that is communicated to the second proxy application.

18. The method of claim 12, further comprising communicating the striped data stream over a plurality of physical layer connections, wherein at least a portion of the plurality of persistent TCP transport layer connections are provided over each of the plurality of physical layer connections.

19. A system for enabling communication of a data stream between a source node and a destination node, comprising:

a first proxy application in communication with the source node;

a second proxy application in communication with the destination node, a plurality of persistent Transmission Control Protocol (TCP) transport layer connections in parallel between the first proxy application and the second proxy application, wherein the plurality of persistent TCP transport layer connections are provided between the first proxy application and the second proxy application over at least one physical layer connection;

a first TCP transport layer client connection that enables the first proxy application to forward the data stream from the source node to the destination node, wherein the first proxy application stripes the data stream over the plurality of persistent TCP transport layer connections to the second proxy application; and a second TCP transport layer client connection that enables the second proxy application to communicate the striped data stream received over the plurality of persistent TCP transport layer connections to the destination node.

20. The system of claim 19, further comprising:

enabling the communication of the data stream to the destination node to appear to the source node as occurring directly over the first TCP transport layer client connection; and enabling communication of the data stream from the source node to appear to the destination node as occurring directly over the second TCP transport layer client connection.

21. The system of claim 19, further comprising if the destination node is remote to the source node, providing the data stream to the first proxy application over a socket interface.

22. The system of claim 19, if a plurality of striped data streams are provided over the plurality of persistent TCP transport layer connections, enabling the first proxy application to employ a dictionary based compression algorithm on at least a portion of at least one data stream that is communicated to the second proxy application.

23. The system of claim 19, further comprising communicating the striped data stream over a plurality of physical layer connections, wherein at least a portion of the plurality of persistent TCP transport layer connections are provided over each of the plurality of physical layer connections.

* * * * *

UNITED STATES PATENT AND TRADEMARK OFFICE
CERTIFICATE OF CORRECTION

PATENT NO. : 7,286,476 B2 Page 1 of 1
APPLICATION NO. : 10/632519
DATED : October 23, 2007
INVENTOR(S) : Helmy et al.

It is certified that error appears in the above-identified patent and that said Letters Patent is hereby corrected as shown below:

On page 2, item (56), under "Other Publications", in column 2, line 4, delete "Alorithm" and insert -- Algorithm --, therefor.

In column 2, line 20, after "need" insert -- to --.

In column 7, line 23, in Claim 3, after "algorithm" delete "is".

Signed and Sealed this

Twenty-fifth Day of December, 2007

JON W. DUDAS
*Director of the United States Patent and Trademark Office*